(No Model.)
J. R. FULTON.
COFFEE POT.
No. 483,839. Patented Oct. 4, 1892.
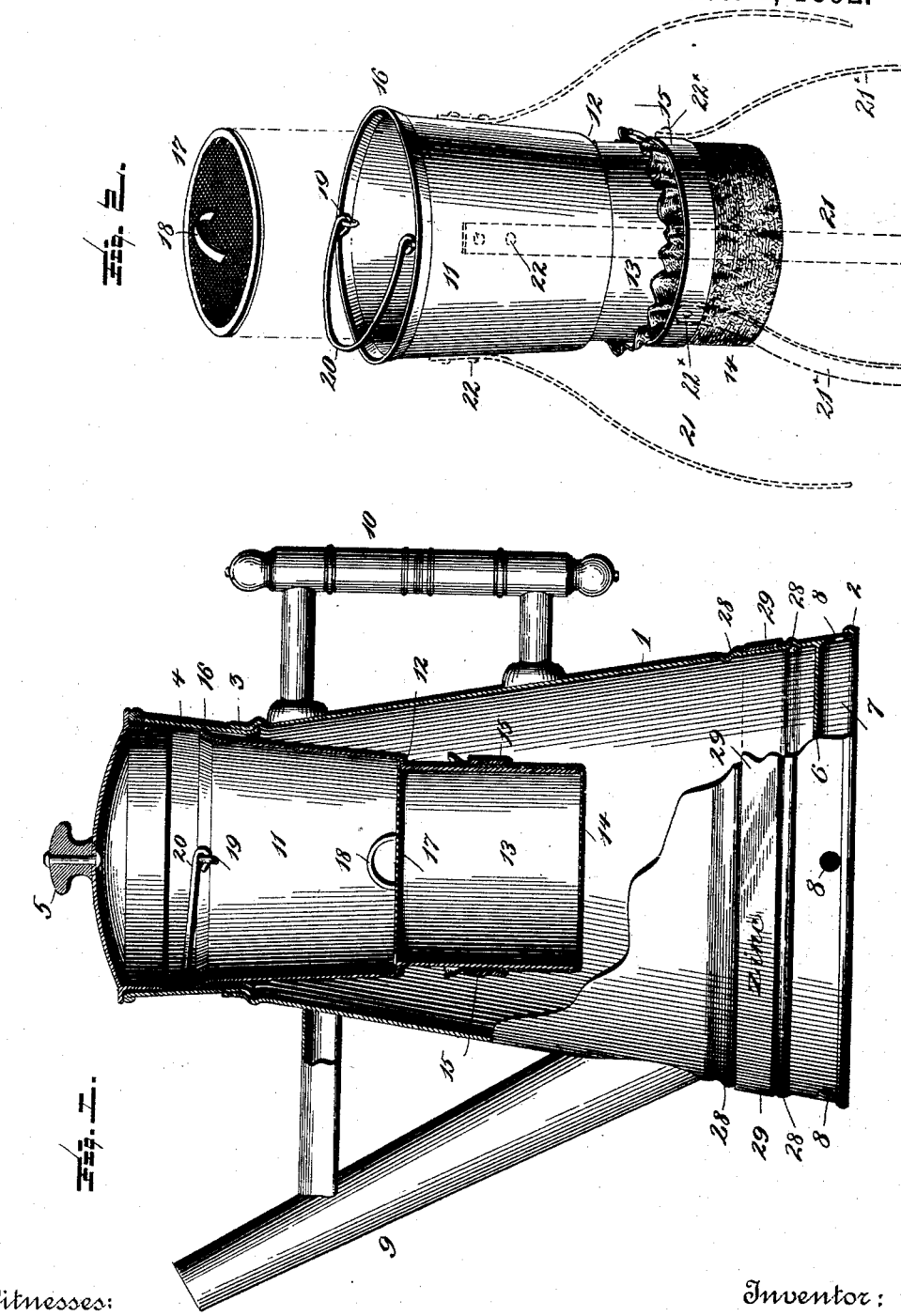
Witnesses:
L. C. Hills
Roy W. Dayton
Inventor:
John R. Fulton,
by Collamer & Co., Attorneys

UNITED STATES PATENT OFFICE.

JOHN R. FULTON, OF WA KEENEY, KANSAS.

COFFEE-POT.

SPECIFICATION forming part of Letters Patent No. 483,839, dated October 4, 1892.

Application filed March 9, 1892. Serial No. 424,292. (No model.)

*To all whom it may concern:*

Be it known that I, JOHN R. FULTON, a citizen of the United States, residing at Wa Keeney, in the county of Trego and State of Kansas, have invented certain new and useful Improvements in Coffee-Pots; and I do hereby declare the following to be a full, clear, and exact description of the invention, such as will enable others skilled in the art to which it appertains to make and use the same.

This invention relates to tea and coffee pots; and the object of the same is to produce an improved pot for the purpose of making tea or coffee.

To this end the invention consists in a pot constructed substantially as hereinafter more fully described and claimed, and as illustrated in the drawings, wherein—

Figure 1 is a central vertical section of this pot complete and ready to make coffee. Fig. 2 is a detail in perspective of the parts of the strainer slightly separated and showing in dotted lines the legs I sometimes attach to this part.

Referring to the said drawings, 1 designates the body of the pot, which rests at its lower end 2 on the support, from which point to its upper end 3 it tapers slightly, as shown. To said upper end is secured rigidly a flaring ring 4, and in the upper end of this ring a cover 5 is adapted to fit to close the pot when desired. The bottom 6 of the body is secured therein at a slight distance above the bottom or lower edge 3 of the body, whereby an air-space 7 is formed between the bottom and the top of the stove when the pot rests thereon. From this space holes 8 open through the sides of the body, whereby the heated air in the air-space is allowed to escape, and hence the liquid within the pot will not be boiled, but only heated. However, if desired, these holes could be omitted and the bottom might rest on the stove direct; but I prefer the construction shown, as it is not my intention to boil the coffee at all.

9 is the spout, which may be of any suitable pattern, as also may the handle 10, and these members may be located opposite or not, as preferred.

I have discovered that the application of a complete ring of zinc to a vessel of tin or other analogous metal will prevent the rusting of the vessel when water or even strong acids are allowed to stand therein. Experiment proves that it is essential that the zinc be in the form of a ring, or at least an endless member, though it is not necessary that it be either within or without the vessel or above or below the water-line. When so used I also find that all parts or members of the vessel which are in close metallic contact therewith are rendered rustproof by the presence of the zinc. In the present case the spout and handle, being soldered, brazed, or riveted to the body, partake of the beneficial results which the zinc offers, and the cover, if closely hinged or caused to fit tightly, will also be rustproof; but I propose to extend this non corrosive function of the zinc to the strainer, which is located within the body, and hence the specific construction thereof described below. The said strainer consists of a slightly-tapering upper portion 11, an inwardly-projecting shoulder 12 at the lower end of the upper member, and a depending cylindrical portion 13, secured to and hanging from the inner edge of the shoulder. A cloth or other fabric 14 is applied to the lower end of the cylindrical portion and retained in place by a ring 15, and I find that such ring will hold much better on a cylindrical portion than on a tapering one. The extreme upper edge of the upper portion is raw—*i. e.*, has no wire bead, as usual—and is turned out, as seen at 16. The taper of this upper portion may be more or less than that of the flaring ring 4, but is preferably about the same; but the outturned edge 16 will fit very closely and tightly within this flaring ring, especially when the strainer is thrown or pushed down into the body and held there by its own gravity and the weight of its contents, which close fit prevents the escape of steam or aroma. A perforated disk 17 fits within the lower end of the upper portion 11 and rests upon the shoulder 12, and this disk can be removed, when desired, by a handle 18, secured thereto. From ears 19 at the upper end of the strainer and within the same, so as not to destroy the close contact between the edge 16 and the flaring ring 4, rises a bail or handle 20, by which the strainer may be raised or lifted out of the pot. In Fig. 2 I have shown in dotted lines legs 21, which may be applied to the strainer, whether the latter is or is not to be used with pots other than that hereinbefore described. These legs are secured, as by riveting, at 22, to the upper portion 11, or legs 21× are preferably riveted, as at 22×, to the ring 15, so as not to interfere with the clamping of the cloth 14, and below the rivets they bow outward, as shown. This construction, while permitting the legs to be sprung together in inserting the strainer in the contracted mouth of the pot, causes them after they have sprung apart to contact with the inner walls of the pot, and the strainer is thereby centered therein accurately, while it is also supported at the proper distance from the bottom.

When used with my improved pot, the legs will be of such length that they will not rest upon the bottom thereof, and hence the strainer will be supported from its upper end, as above described. If the legs 21× are used, their curvature is preferably such that their tips will bear frictionally against the inner walls of the pot, whereby a metallic contact will be maintained between the ring 15 and the pot, so as to prevent rusting of the ring.

I have shown in the accompanying drawings but one of many ways in which the zinc ring could be applied, and this is the preferred manner. Between crimps 28 in the body of the pot is located a thin zinc ring 29, about a half-inch wide and soldered or otherwise secured to the body. The crimps may even be omitted or but one need be used, it being only essential that the zinc shall stand in close metallic contact with the body and form a complete ring. Its presence, as above stated, will then prevent the rusting of the pot either outside or inside, and when the strainer fits as closely as its outturned edge 16 will permit, it will also be rustproof.

In operation the coffee to be cooked is ground very fine, as fine, perhaps, as flour, and the desired quantity thereof placed in the strainer on the fabric. The strainer is then inserted in the body to the position shown in Fig. 1, the disk put in place, and boiling water poured in upon the disk. The latter breaks the force of the fall of the water (which might force some of the fine coffee through the fabric) and separates it into fine streams, which flow through the perforations in the disk and fall on the grounds or powdered coffee. The essence, aroma, flavor, strength, and even some of the powdered coffee itself run through the meshes in the fabric and collect in the form of strong excellent coffee in the bottom of the body, whence it can be poured out the spout as it is needed. The cover is applied to prevent the escape of steam or vapors, and when it is desired to keep the coffee hot the pot can be placed upon the stove, the holes 8 preventing the undesirable boiling of the then thoroughly-cooked coffee. This pot may be allowed to stand an unlimited length of time with water or other liquid in it and the presence of the zinc ring will prevent all rusting of any of the parts. At the same time the zinc never comes in contact with the contents and the latter cannot be fouled thereby.

Having thus described my invention, what I do claim as new is—

1. A strainer for coffee-pots, the same consisting of an upper portion having an outturned upper end, an inwardly-projecting shoulder at the lower end thereof, a cylindrical lower portion depending from the inner edge of said shoulder, a fabric clamped over the open lower end of said lower portion, and a perforated disk resting on said shoulder, combined with a pot whose body tapers to its upper end, a flaring ring secured in such upper end and adapted to receive the flaring upper end of the strainer, and a cover for said ring, substantially as described.

2. In a coffee-pot, the combination, with the body of the pot tapering to its upper end, a flaring ring secured in said upper end, a cover therefor, and a zinc ring secured in close metallic contact on said body, of the strainer, substantially as described, its upper portion flaring upwardly and its upper edge being raw and turned out so as to fit closely within said flaring ring, as and for the purpose set forth.

3. In a coffee-pot, the combination, with the body of the pot having annular crimps and a zinc ring secured between said crimps and in close metallic contact with said body, of a strainer, substantially as described, and a wedging connection between the body and the strainer, whereby they are held in close metallic contact, as and for the purpose set forth.

4. The combination, with a pot having a zinc ring on its body, of a strainer consisting of an upper portion in close metallic connection with the body, a cylindrical lower portion, a fabric over the open lower end of the latter, a removable ring clamping said fabric in place thereon, and spring-legs secured to said ring, bowing outward beyond the fabric depending below the lower end of the lower portion and in close metallic contact with the body, substantially as hereinbefore described.

In testimony whereof I affix my signature in presence of two witnesses.

JOHN R. FULTON.

Witnesses:
N. L. COLLAMER,
ROY W. DAYTON.